No. 891,792. PATENTED JUNE 23, 1908.
J. F. BUSH.
CAR STOP AND SPEED SIGNAL.
APPLICATION FILED NOV. 20, 1907.
2 SHEETS—SHEET 1.
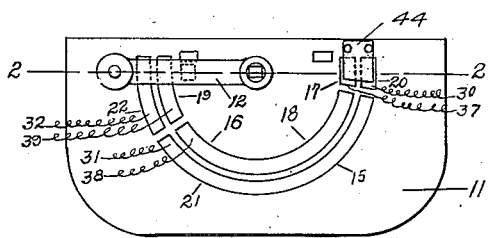
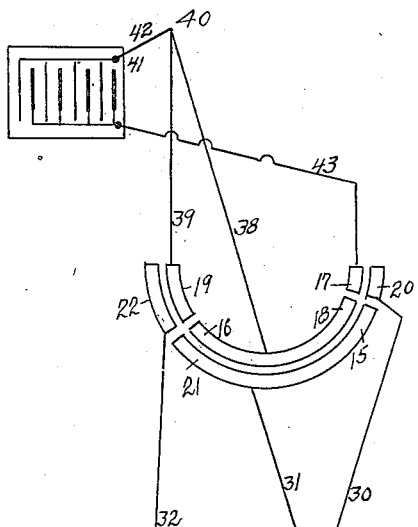
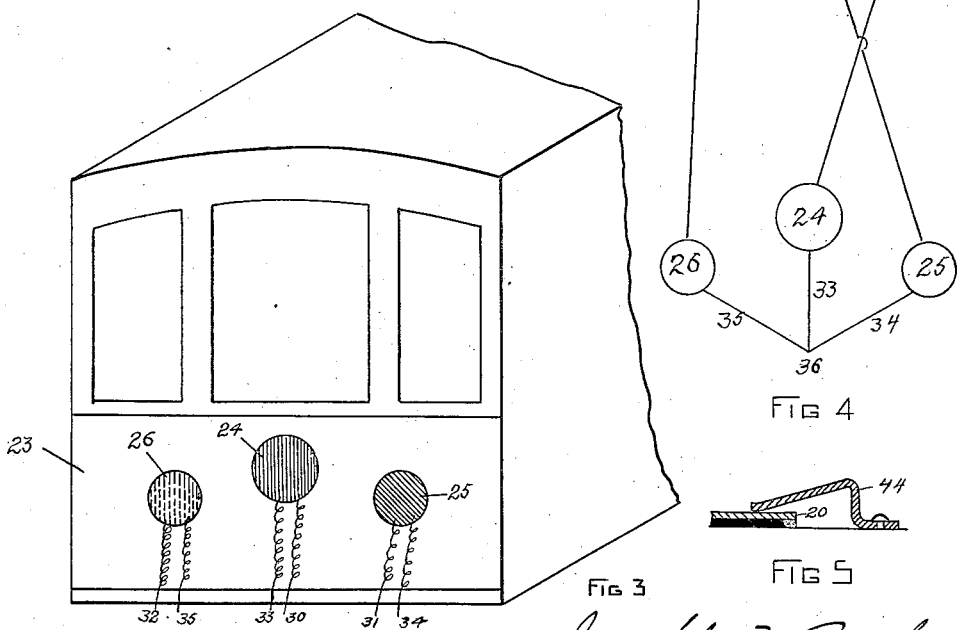

No. 891,792. PATENTED JUNE 23, 1908.
J. F. BUSH.
CAR STOP AND SPEED SIGNAL.
APPLICATION FILED NOV. 20, 1907.

2 SHEETS—SHEET 2.

WITNESSES:
Bessie M. Tolhurst.
E. Marion Slater.

Joseph F. Bush
INVENTOR

BY
Geo. L. Cooper
ATTORNEY.

UNITED STATES PATENT OFFICE.

JOSEPH F. BUSH, OF SCHENECTADY, NEW YORK, ASSIGNOR OF THIRTY-FIVE ONE-HUNDREDTHS TO GEORGE LEWES COOPER, OF TROY, NEW YORK.

CAR STOP AND SPEED SIGNAL.

No. 891,792.  Specification of Letters Patent.  Patented June 23, 1908.

Application filed November 20, 1907. Serial No. 403,000.

*To all whom it may concern:*

Be it known that I, JOSEPH F. BUSH, a citizen of the United States, and a resident of Schenectady, New York, have invented certain new and useful Improvements in Car Stop and Speed Signals, of which the following is a specification.

My invention is intended to prevent or lessen the possibility of collisions between cars or trains, and particularly rear-end collisions. Many of these occur because of the inability of the motor-man or engineer of the rear train to determine in time whether the car or train ahead is at rest or in motion, and if in motion, at what speed.

My device includes a series or plurality of visual signals, one of which indicates that the car is at rest, or at least not under power, while another or others show that it is in motion. Preferably I employ two or more of these second signals, each of which indicates a different speed.

My device may be applied to any power-driven vehicle which is started and stopped by a throttle or other valve, a switch, or like manual means. It may be used on a single vehicle or on a train of any desired length.

My invention also includes the use of two or more signals to indicate the varying speeds of the vehicle, car or train, or, more explicitly, variations of the power applied to produce such speed variations, whether or not a signal is provided to indicate that the vehicle is at rest, or that no power is applied.

It will be obvious that my invention may be embodied in many different forms, varying with the service required and the design of the vehicle, as well as with the taste and skill of the constructing engineer. As the advantages of my invention are especially important in the running of trolley cars, which necessarily make frequent stops and changes of speed, I will illustrate it as applied to one of these, but with no intention of limiting its scope or the form of its embodiment except as set forth in the claims.

Figure 6:
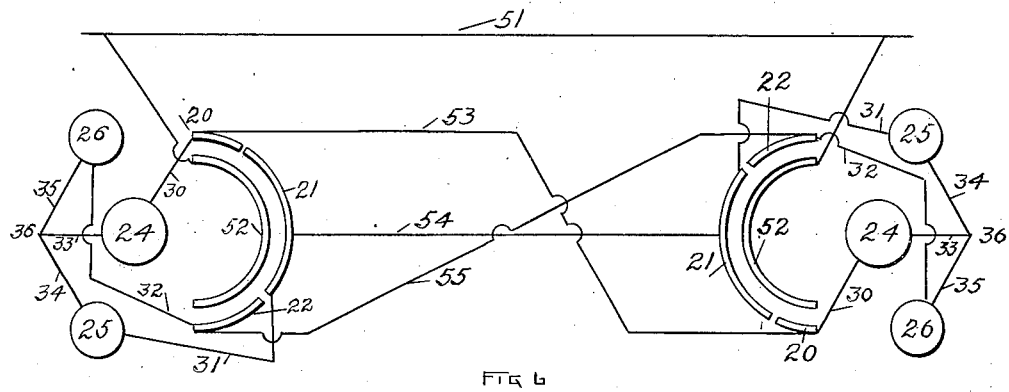
Figure 7:
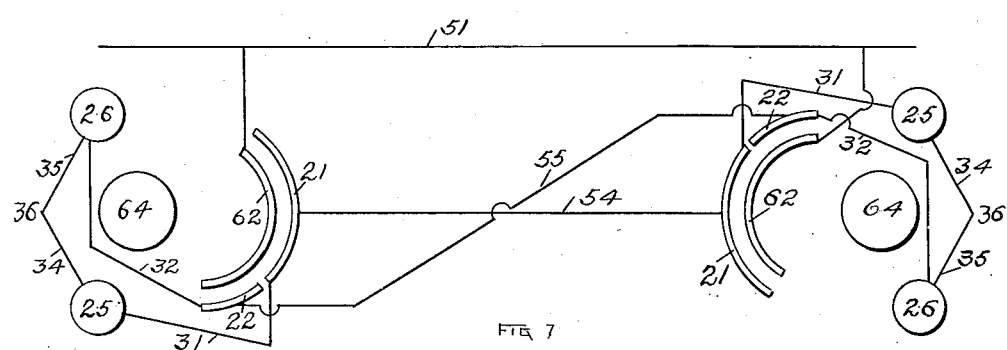
Figure 8:
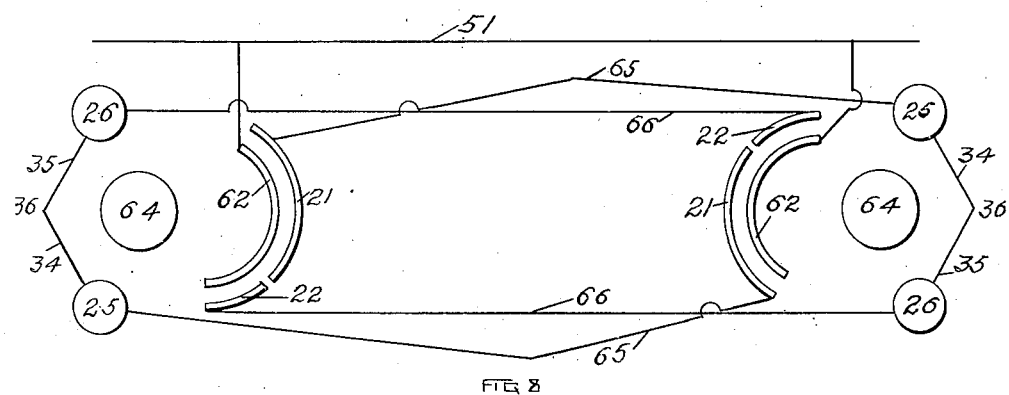

In the drawings, Figure 1 represents in top plan view, a switch or controller box of a trolley car; Fig. 2 is a vertical section through the plane 2—2, Fig. 1; Fig. 3 is a partial rear-end view of the car; Fig. 4 is a diagram of the wiring, Fig. 5 is a partial sectional view of the controller box, showing a modification, Figs. 6, 7, and 8 are diagrams showing the wirings of various modified forms of my device.

Referring first to Figs. 1 to 4 of the drawings, 11 designates the top of a controller box and 12 the manual switch handle shown as having two downwardly projecting lugs 13, 14 adapted to contact with two concentric series of segments 15, 16 of conducting material, located on and insulated from the box 11. Each of the series 15, 16 is divided in the present instance into three segments or contacts, numbered 17, 18, 19 and 20, 21, 22 respectively. Mounted at the rear of the car and, as shown, on the rear dash 23, are three electric lamps, 24, 25, 26, differing from each other in value, *i. e.*, either in intensity or color, preferably the latter. In the present instance, they are shown as provided with lenses or plates of red, green and yellow, see Fig. 3.

The wiring of the device is shown, in greatly simplified diagram, in Fig. 4. It will be seen that the segments 20, 21, 22 of the outer series 15 are connected by wires 30, 31, 32 to one contact of each of the lamps 24, 25, 26 respectively, while the other contacts of the lamps are connected by wires 33, 34, 35 to the return or rail portion of main line circuit, marked 36. The inner series of plates or segments 17, 18, 19 are connected by wires 37, 38, 39 to the trolley side of main line circuit, marked 40.

Leaving out of consideration for the moment the switch 44, the operation of the device is as follows: When the car is at rest, the manual switch handle 12 will be turned to the right of Fig. 1, so that its lugs 13, 14 will contact with the plates or segments 20, 17, thereby electrically connecting them. Current will then flow from a storage battery 41, which is connected by a wire 42 to main line circuit, indicated at 40, through wires 43, 30 to the center lamp 24, thence through wire 33 to rail side of circuit, indicated at 36, so that this lamp, shown as having a red lens or cover-plate, will be lighted. In the same way, when the motor-man turns the switch to start the car, the handle will connect the segments 18, 21, when current will flow from main line 40 through the wires 38, 31, 34 to light the "part-speed" lamp 25. So too, the movement of the handle 12 to nearly or quite full speed, the latter position of the handle being shown in Fig. 1, will connect the trolley line and rail circuit points 40, 36, through wire 39, segment 19, handle 12, segment 22, wire 32, lamp 26 and wire 35, thus incandescing this "full-speed" lamp. It is obvious that by connecting the lamp 24, indicating "car not under power", to the storage battery 41 rather than directly to main line, the lamp will continue to burn even if the trolley is lowered from the line wire, as, e. g., where a short distance car is being switched from one track to the other.

Fig. 5 of the drawings is an enlarged view of a spring switch plate 44, also shown in Fig. 1. It normally stands away from the segments 17, 20, but is adapted to be forced into contact with them by the switch-handle 12 bearing on its upper face. This serves as an additional safeguard when the car is at rest, and hence most liable to rear-end collision.

It will, of course, be understood that suitable resistance may be inserted at any desired point between the main trolley line 40 and the return line 36 to reduce line voltage to that of the lamps.

It is also clear that a mere extension of the wires 30, 31 and 32 is all that is required to adapt the device to a train of any desired number of cars, the controlling device being placed at the forward end of the train and the lamp system at its rear. The word "car", as used in the claims, is therefore to be understood as including a train of cars, or any vehicle or vehicles on which the device may be advantageously used.

In Fig. 6 of the drawings I have shown in simplified diagram a method of wiring in which a series of electric signal lamps at each end of a car is connected with the contact plates, shown as before as of segmental shape mounted under and in the path of the switch handle, at the opposite end of the car. In this illustration the storage battery is dispensed with, both inner contact plates or segments 52 being connected with main line through a wire 51. It is obvious that the single segment 52 here takes the place of the three separate plates 17, 18, 19 of Fig. 4. As before the outer series of segments 20, 21, 22 are connected by wires 30, 31, 32 to the lamps 24, 25, 26 respectively, which in turn are connected by wires 33, 34, 35 to return or rail line 36. In addition the segments 20, 20 at opposite ends of the car are connected by wire 53, the segments 21, 21 by wire 54, and the segments 22, 22 by wire 55. It will be seen that when the switch handle on either controller box is turned to connect a segment 52 with a segment 20, both lamps 24, one at each end of the car, will be in circuit and will glow. In like manner, a further movement of the switch will connect the plate 52 with the part 21, thereby lighting the lamps 25, 25. So also both lamps 26 will be brought into play whenever either handle reaches a plate or segment 22, thus indicating "full speed", at both ends of the car.

Fig. 7 shows a further modification of the device in which the segments 20 and the lamps 24, indicating the "at rest" or "no power" status of the car are omitted. Constant lamps 64, either electric or oil, and which may be the usual head and tail lamps of the car, take the place of the lamps 24, the absence of an additional light indicating the opening of the controller switch. In other respects the construction and operation are as described with reference to Fig. 6.

A wire 51 connects both inner segments 62 with main line or lighting circuit, the inner segments being cut off at the starting end. The outer segments 21 are each connected by a wire 31 to one pole of a lamp 25 of one color, and the segments 22 by wires 32 to lamps 26 of another color. The other poles of the lamps are connected to return line 36 by wires 34, 35 as before. Similarly the outer plates or segments 21 are connected by a wire 54, and the segments 22 by a wire 55. It is evident that when either switch handle is in its "cut-off" position it does not contact with any segment. When it closes the trolley circuit it connects segments 62 and 21, and lights the lamps 25, one at each end of the car. When it reaches practically "full-speed" position it contacts with segment 22 and lights both lamps 26.

The advantages of the two systems last described, in which both front and rear lights are simultaneously, as well as automatically operated, are many and obvious. Thus, in interurban, single-track service, it may be as important for the motor-man or engineer of the car in front of another, say on a switch, to know whether the other car is standing or moving, as it is for the operator of a following car. So in urban service, the shifting of the front lights enables a person hailing a car to know whether the motorman has seen him and cut off power. Again, an inspector may see from any point near the track whether instructions to reduce speed at crossings, curves or the like are being obeyed. When it is preferred to forego these advantages, the wiring of Fig. 8 may be adopted. In this form, the two sets of segments, 62, 21, 22 and of lamps 25, 26, together with the wire 51 leading to the segments 62, and the constant lamps 64 are the same as in Fig. 7. Each "part-speed" plate 21 is here connected only to the lamp 25 at the opposite end of the car, and each "full-speed" segment 22 to the opposite lamp 26, by wires 65 and 66 as shown.

The essence of my invention lies in the completely automatic control of one or more "tail" or other signal lights so located on the car as to be visible at a distance therefrom, by a mere movement of a starting device or of a speed controlling device or of both such devices, with no requirement of care or attention on the part of the motor-man or engineer.

I claim:

1. In combination with means for varying the power applied to a car, a plurality of visual signals for indicating such power variation carried on said car and automatically controlled by said power varying means, said signals being so located on the car as to be visible at a distance therefrom, substantially for the purposes specified.

2. In combination with means for varying the power applied to a car, a plurality of visual signals for indicating such power variation carried on said car and connected with said power varying means so as to be automatically and successively operated thereby, said signals being so located on the car as to be visible at a distance therefrom, substantially for the purposes specified.

3. In combination with means for varying the power applied to a car, a plurality of visual signals of different values for indicating such power variation carried on said car and automatically controlled by said power varying means, said signals being so located on the car as to be visible at a distance therefrom, substantially for the purposes specified.

4. In combination with means for varying the speed of a car, a plurality of visual signals for indicating such speed variation carried on said car and automatically controlled by said speed varying means, said signals being so located on the car as to be visible at a distance therefrom, substantially for the purposes specified.

5. In combination with means for varying the speed of a car, a plurality of visual signals for indicating such speed variation carried on said car and connected with said speed varying means so as to be automatically and successively made operative thereby, said signals being so located on the car as to be visible at a distance therefrom, substantially for the purposes specified.

6. In an electric car, a controller switch for varying the speed of the car, a plurality of electric signal lamps, and means whereby said lamps are automatically operated by said switch as the speed is so varied, said lamps being so located on the car as to be visible at a distance therefrom, substantially for the purposes specified.

7. In an electric car, a controller switch for varying the speed of the car, a plurality of electric signal lamps, and means whereby said lamps are automatically and successively operated by said switch as the speed is so varied, said lamps being so located on the car as to be visible at a distance therefrom, substantially for the purposes specified.

8. In combination with means for varying the speed of a car, a plurality of visual signals of different values for indicating such speed variation carried on said car and automatically controlled by said speed varying means, said lamps being so located on the car as to be visible at a distance therefrom, substantially for the purposes specified.

9. In combination with means for varying the speed of a car, a plurality of visual signals of different values for indicating such speed variation carried on said car and connected with said speed varying means so as to be automatically and successively made operative thereby, said signals being so located on the car as to be visible at a distance therefrom, substantially for the purposes specified.

10. In an electric car, a controller switch for varying the speed of the car, a plurality of electric signal lamps, of different values, and means whereby said lamps are automatically operated by said switch as the speed is so varied, said lamps being so located on the car as to be visible at a distance therefrom, substantially for the purposes specified.

11. In an electric car, a controller switch, a plurality of electric signal lamps, means whereby said lamps are automatically operated by said switch, a battery, and means operative by said switch when in its cut-off position for connecting one of said lamps with said battery, certain other of said lamps being entirely disconnected from said battery and supplied with current from power line.

12. In an electric car, a controller box, a manual switch for varying the speed of the car on said box, a plurality of separate contact segments mounted on the top of said box and insulated therefrom and lying in the path of said switch, and a plurality of electric signal lamps each of which is electrically connected with one of said segments, whereby the movement of said switch automatically and successively switches said lamps into circuit as the speed is so varied, said lamps being so located on the car as to be visible at a distance therefrom, substantially for the purposes specified.

13. In an electric car, a controller box, a manual switch on said box, a plurality of separate contact segments mounted on the top of said box and insulated therefrom and lying in the path of said switch, one of said segments contacting with said switch only when the latter is in its cut-off position, a storage battery, a spring switch for connecting said battery with said last-named segment and lying in the path of said controller switch so as to be closed thereby, and a plurality of electric signal lamps each of which is electrically connected with one of said segments, whereby the movement of said controller switch automatically and successively switches said lamps into main circuit, and whereby the movement of said controller switch to its cut-off position connects one of said lamps with said battery.

14. In an electric car, controller switches, one of which is located at each end of said car, visual signals, one of which is also located at each end of said car, and means connecting each of said switches with the signal at the opposite end of the car for controlling the same.

15. In an electric car, controller switches for varying the speed of the car, one of which is located at each end of said car, two series of visual signals, one of which is also located at each end of said car, and means connecting each of said switches with the signals at the opposite end of the car for varying the same as the speed is varied.

16. In a car, two independent starting and stopping means, one of which is located at each end of the car, and visual signals, one of which is also located at each end of the car and is automatically controlled by the starting means at the opposite end of the car.

17. In a car, two independent starting and stopping means, one of which is located at each end of the car, visual signals, one of which is also located at each end of the car, and means whereby said signals are automatically operated by either of said starting means.

18. In a car, two independent speed varying means, one of which is located at each end of the car, two series of visual signals, one of which series is also located at each end of the car, and means whereby predetermined signals of each of said series are automatically and simultaneously operated by either of said speed varying means.

19. In an electric car, two controller switches, one at each end of the car, two series of electric signal lamps, one at each end of the car, and means whereby predetermined lamps in each of said series are simultaneously and automatically controlled by either of said switches.

20. In a car, starting and stopping means, and visual signals, one at each end of said car and so located as to be visible at a distance therefrom, both said signals being simultaneously and automatically controlled by said starting means.

21. In a car, speed varying means, two series of visual signals, one at each end of said car and so located as to be visible at a distance therefrom, and means whereby predetermined signals of each of said series are automatically and simultaneously operated by said speed varying means.

22. In an electric car, a controller switch, two series of electric signal lamps, one at each end of the car and so located as to be visible at a distance therefrom, and means whereby predetermined lamps in each of said series are simultaneously and automatically controlled by said switch.

JOSEPH F. BUSH.

Witnesses:
 GEO. L. COOPER,
 A. FAIRWEATHER.